May 8, 1934.  A. E. RICE  1,957,614

DIRECT CHAIN DRIVE

Filed June 12, 1931

Inventor
Allen Erwin Rice
By Lyon & Lyon
Attorneys

Patented May 8, 1934

1,957,614

UNITED STATES PATENT OFFICE 1,957,614

DIRECT CHAIN DRIVE

Allen Erwin Rice, Palos Verdes, Calif., assignor, by mesne assignments, to The National Superior Company, Toledo, Ohio, a corporation of Delaware Application June 12, 1931, Serial No. 543,806

9 Claims. (Cl. 74—21)

This invention relates to rotary drawworks, and more particularly to an improvement in a rotary drawworks of the three-shaft, two-post type as illustrated, for example, in the Edwin W. Goeser Patent No. 1,763,511 for two-post three-shaft drawworks issued June 10, 1930.

In a rotary drawworks of the type illustrated in the Goeser patent above referred to, when the low speed jackshaft clutch is engaged for picking up heavy loads and it is desired to use the highest speed for raising the elevators or the like, it is necessary to disengage the low speed clutch and throw in the high speed jackshaft clutch before the high speed clutch on the drumshaft is engaged.

This method of operation entails considerable loss of time and necessitates the driller operating so many clutches that it is common practice not to make this change but to take the elevators up in the derrick using the low speed jackshaft clutch and the high speed drumshaft clutch. The present era of high speed drilling necessitates the operation of the drilling equipment at high speed without such delay in the operation of the structure as is occasioned in a structure like that disclosed in the Goeser patent.

It is therefore an object of this invention to provide for a two-post three-shaft rotary drawworks a driving means which eliminates the delay occasioned in shifting from the low speed drive to the highest speed drive wherein a direct drive from the jackshaft to the rotary drumshaft is provided by passing the third or lineshaft of the drawworks including a sprocket secured to the driller's end of the jackshaft a free running sprocket mounted upon the corresponding projecting end of the drumshaft and a clutch mechanism of the sliding jaw type or other suitable friction clutch provided for engaging this high speed direct chain drive sprocket when the highest speed drive of the rotary drawworks is desired.

Other objects and advantages of this invention it is believed will be apparent from the following detailed description of a preferred embodiment thereof as illustrated in the accompanying drawing.

Figure 1:
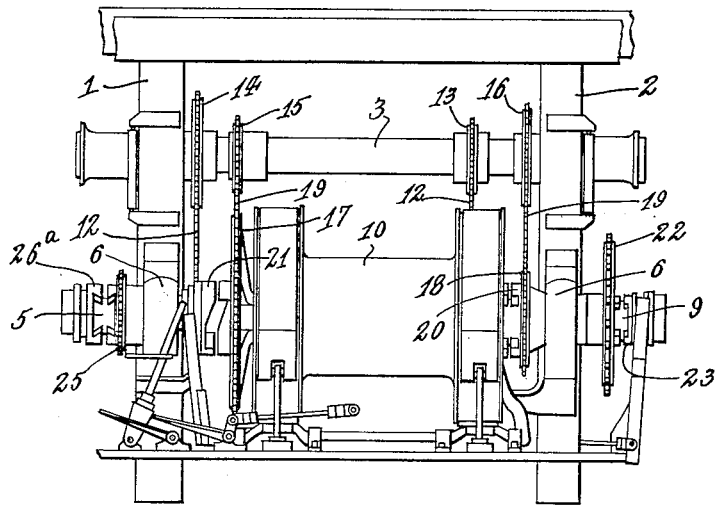
Figure 1 is a front elevation of a two-post three-shaft rotary drawworks embodying my invention.
Figure 2:
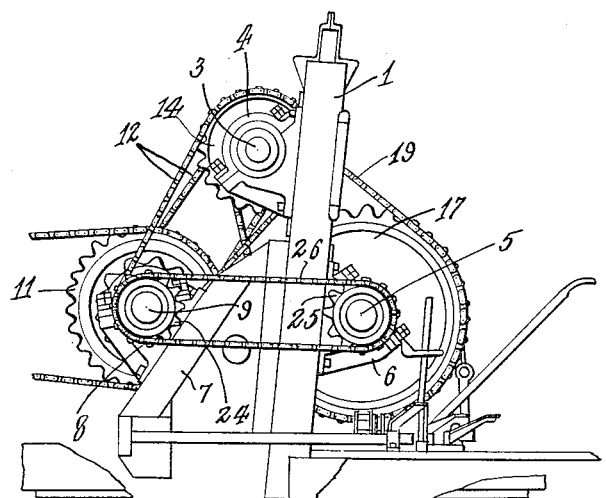
Figure 2 is a side elevation thereof.
Figure 3:
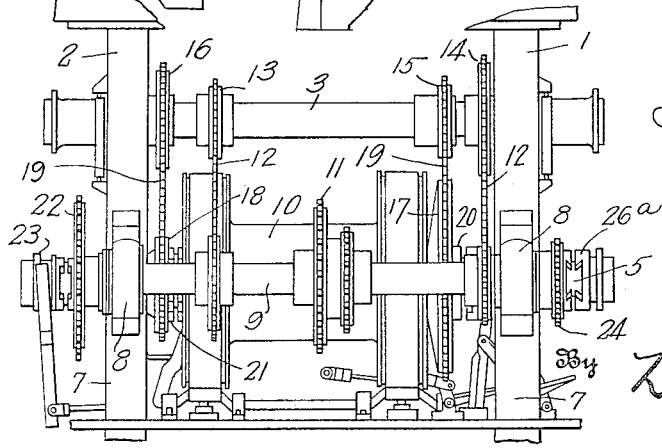
Figure 3 is a rear elevation thereof.

In the preferred embodiment of my invention illustrated in the accompanying drawing, 1 and 2 indicate the posts of the rotary drawworks upon which the lineshaft 3 is journaled in bearings 4. On the opposite sides of the posts 1 and 2 the drumshaft 5 is journaled in bearings 6 secured to the posts 1 and 2. Secured to the posts 1 and 2 at their upper ends and to the base of the rotary drawworks at their lower ends are inclined braces 7 carrying bearings 8 in which the jackshaft 9 is journaled.

Secured to the drumshaft 5 is a hoisting drum 10 which may be of any suitable or desirable construction as is well understood in the art.

Mounted on the jackshaft 9 is the engine drive sprocket 11 which is driven from any suitable or desirable form of prime mover. The lineshaft 3 is driven from the jackshaft 9 through a series of sprockets releasably clutched to the jackshaft 9.

Chains 12 are trained over the sprockets on the jackshaft 9 and pass over sprockets 13 and 14 keyed to the lineshaft 3. Sprockets 15 and 16 are secured to the lineshaft 3 in alignment with sprockets 17 and 18 journaled on the drumshaft 5. Chains 19 are passed over the sprockets 15 and 17, and 16 and 18. Clutches 20 and 21 are provided for clutching selectively sprockets 17 and 18 to the drumshaft 5.

Journaled on the jackshaft 9 beyond the end of the post 2 is a rotary machine drive sprocket 22. The clutch 23 is provided for releasably clutching the rotary machine drive sprocket 22 to the jackshaft 9.

With the low speed drive connection from the jackshaft 9 to the lineshaft 3 engaged, and with the low speed drive connection from the lineshaft 3 to the drumshaft 5 engaged, when it is desired to operate the rotary drawworks through the highest speed available, it is necessary to disengage the low speed drive sprocket clutch on the jackshaft 9, engage the high speed drive sprocket clutch of the jackshaft 9, disengage the clutch 21 of the drumshaft 5, and engage the clutch 22 on the drumshaft 5. This multiple clutch operation causes a serious delay in this type of drawworks construction.

In accordance with my invention, I mount on the projecting end of the jackshaft 9 beyond the end of the post 1 a high speed direct chain drive sprocket 24 which is keyed to the shaft 9 in alignment with the high speed direct drive drum shaft sprocket mounted on the projecting end of the drumshaft 5 beyond the post 1. A chain 26 is trained between the sprockets 24 and 25. A clutch 26a, preferably of the sliding jaw type as herein illustrated or a suitable form of friction clutch, is employed on the shaft 5 for releasably clutching the sprocket 25 to the drumshaft 5.

With this type of construction when it is desired to change from the lowest speed drive from the jackshaft through the lineshaft back to the drumshaft to the highest speed drive provided in this rotary drawworks, it is only necessary to throw the clutch 21 and engage the clutch 26a.

Any suitable or desirable means may be employed for shifting the clutch 26a into engagement with the sprocket 25, and applicant deems it unnecessary to specifically point out and describe the construction or operation of such a clutch shifter as is well understood in the art.

Having fully described my invention, it is to be understood that I do not wish to be limited to the details herein set forth, but my invention is of the full scope of the appended claims.

I claim:

1. In a rotary drawworks, the combination of a supporting structure, a drumshaft journaled on said structure, a lineshaft journaled on said structure above said drumshaft, a plurality of drumshaft drive sprockets secured to the lineshaft, a plurality of drumshaft driven sprockets journaled on the drumshaft, chains trained over the pairs of sprockets on the line and drumshafts respectively enabling the driving of the drumshaft from the lineshaft at a plurality of speeds, clutch means for releasably clutching the drumshaft driven sprockets to the drumshaft, a jackshaft rotatably supported by the structure, an engine drive sprocket mounted on the jackshaft for driving the jackshaft, a plurality of driving sprockets mounted on the jackshaft, a plurality of driven sprockets secured to the lineshaft, chains trained over the pairs of sprockets on the lineshaft and jackshaft respectively for driving the lineshaft from the jackshaft at a plurality of speeds, clutch means for releasably clutching the jackshaft sprockets to the jackshaft, a high speed drumshaft direct drive sprocket secured to the jackshaft beyond the end of the supporting structure, a high speed drumshaft direct driven sprocket journaled on the drumshaft beyond the ends of the supporting structure, a chain connecting the direct drive and driven sprockets, and clutch means mounted on the drumshaft for releasably clutching the drumshaft direct driven sprockets to the drumshaft.

2. In a rotary drawworks, the combination of a supporting structure, a drumshaft journaled on said structure, a lineshaft journaled on said structure above said drumshaft, a plurality of drumshaft drive sprockets secured to the lineshaft, a plurality of drumshaft driven sprockets journaled on the drumshaft, chains trained over the pairs of sprockets on the lineshaft and drumshaft respectively enabling the driving of the drumshaft from the lineshaft at a plurality of speeds, clutch means for releasably clutching the drumshaft driven sprockets to the drumshaft, a jackshaft rotatably supported by the structure, an engine drive sprocket mounted on the jackshaft for driving the jackshaft, a plurality of driving sprockets mounted on the jackshaft, a plurality of driven sprockets secured to the lineshaft, chains trained over the pairs of sprockets on the line-shaft and jackshaft respectively for driving the lineshaft at a plurality of speeds from the jackshaft, clutch means for releasably clutching the jackshaft sprockets to the jackshaft, a high speed drumshaft direct drive sprocket mounted on the jackshaft, a high speed drumshaft direct drive sprocket journaled on the drumshaft, a chain trained over the said direct drive sprockets, and clutch means for releasably engaging the said direct drive means from the jackshaft to the drumshaft.

3. In a rotary drawworks, the combination of a supporting structure, a drumshaft journaled on said structure, a lineshaft journaled on said structure above the drumshaft, means for driving the drumshaft from the lineshaft at a plurality of speeds, a jackshaft journaled on said supporting structure to the rear of the drumshaft, means mounted on the said jackshaft for driving the same, means for driving the lineshaft at a plurality of speeds from the jackshaft, direct drumshaft drive means mounted on the jackshaft beyond the end of said supporting structure, direct drumshaft driven means journaled on the drumshaft in alignment with said direct drumshaft drive means, and means for releasably clutching the latter said driven means to the drumshaft.

4. In a rotary drawworks, the combination of a supporting structure, a drumshaft journaled on said structure, a lineshaft journaled on said structure above the drumshaft, means for driving the drumshaft from the lineshaft, a jackshaft journaled on said supporting structure to the rear of the drumshaft, means mounted on the jackshaft for driving same, means for driving the lineshaft from the jackshaft, direct drumshaft drive means mounted on the jackshaft beyond the end of said supporting structure, direct drumshaft driven means journaled on the drumshaft in alignment with said direct drumshaft drive means, and means for releasably clutching the latter said driven means to the drumshaft.

5. In a rotary drawworks, the combination of a supporting structure, a drumshaft journaled on said structure, a lineshaft journaled on said structure above the drumshaft, means for driving the drumshaft from the lineshaft, a jackshaft journaled on said supporting structure to the rear of the drumshaft, means mounted on said jackshaft for driving the same, means for driving the lineshaft at a plurality of speeds from the jackshaft, direct drumshaft drive means mounted on the jackshaft beyond the end of said supporting structure, direct drumshaft driven means journaled on the drumshaft in alignment with said direct drumshaft drive means, and means for releasably clutching the latter said driven means to the drumshaft.

6. In a rotary drawworks, the combination of a supporting structure, a drumshaft journaled on said structure, a lineshaft journaled on said structure above the drumshaft, means for driving the drumshaft from the lineshaft at a plurality of speeds, a jackshaft journaled on said supporting structure to the rear of the drumshaft, means mounted on the jackshaft for driving the same, means for driving the lineshaft from the jackshaft, direct drumshaft drive means mounted on the jackshaft beyond the end of said supporting structure, direct drum shaft driven means journaled on the drumshaft in alignment with said direct drumshaft drive means, and means for releasably clutching the latter said driven means to the drumshaft.

7. In a rotary drawworks, the combination of a supporting structure, a drumshaft journaled on said structure, a lineshaft journaled on said structure above the drumshaft, means for driving the drumshaft from the lineshaft, a jackshaft journaled on said supporting structure to the rear of the drumshaft, means mounted on the jackshaft for driving the same, means for driving the lineshaft from the jackshaft, direct drumshaft drive means mounted on the jackshaft, direct drumshaft driven means journaled on the drumshaft in alignment with said direct drumshaft drive means, and means for releasably clutching the latter said driven means to the drumshaft.

8. In a rotary drawworks, the combination of a supporting structure, a drumshaft journaled on said structure, a lineshaft journaled on said structure above the drumshaft, means for driving the drumshaft from the lineshaft, a jackshaft journaled on said supporting structure to the rear of the drumshaft, means mounted on said jackshaft for driving the same, means for driving the lineshaft from the jackshaft, a direct drumshaft drive sprocket mounted on the jackshaft, a direct drumshaft drive sprocket mounted on the drumshaft, a chain trained over the said direct drumshaft drive sprockets, and clutch means for releasably engaging the said direct drumshaft drive between the jackshaft and the drumshaft.

9. In a rotary drawworks, the combination of a supporting structure, a drumshaft journaled on said structure, a lineshaft journaled on said structure, means for driving the drumshaft from the lineshaft at a plurality of selected speeds, a jackshaft journaled on said structure to the rear of the drumshaft, means for driving the lineshaft from the jackshaft at a plurality of selected speeds, a rotary machine drive sprocket mounted on the jackshaft beond one end of said supporting structure, a direct drive means between the jackshaft and the drumshaft beyond the other end of said supporting structure, and means for releasably engaging the said direct drive means.

ALLEN ERWIN RICE.